United States Patent [19]
Wellinger

[11] Patent Number: 5,678,680
[45] Date of Patent: Oct. 21, 1997

[54] METHOD AND ARRANGEMENT FOR PRODUCING CONSOLIDATED LINES OF PRODUCTS

[75] Inventor: Bernhard Wellinger, Donzhausen, Switzerland

[73] Assignee: SFT AG Spontanfoerdertechnik, Weinfelden, Switzerland

[21] Appl. No.: 417,056

[22] Filed: Apr. 5, 1995

[30] Foreign Application Priority Data

Apr. 13, 1994 [CH] Switzerland ............ 01 095/94

[51] Int. Cl.⁶ ................................. B65G 47/30
[52] U.S. Cl. ............ 198/418.2; 198/448; 198/437; 198/444
[58] Field of Search ................. 198/418, 418.2, 198/448, 434, 437, 444, 447, 349

[56] References Cited

U.S. PATENT DOCUMENTS

| | | | |
|---|---|---|---|
| 3,191,357 | 6/1965 | Hawley et al. | 198/418.2 X |
| 4,262,792 | 4/1981 | Davies | 198/434 X |
| 4,440,289 | 4/1984 | Weis | 198/448 |
| 4,673,078 | 6/1987 | Swiatlowski et al. | 198/418.2 X |
| 5,007,521 | 4/1991 | Tanaka | 198/448 X |

FOREIGN PATENT DOCUMENTS

| | | |
|---|---|---|
| 0403726 | 12/1990 | European Pat. Off. |
| 2582629 | 12/1986 | France |
| 3630095 | 3/1988 | Germany |
| 700262 | 11/1953 | United Kingdom |

*Primary Examiner*—D. Glenn Dayoan
*Attorney, Agent, or Firm*—Spencer & Frank

[57] ABSTRACT

A method and an arrangement for producing consolidated lines having a predetermined content of products of a plurality of product types, each line being produced in a sequence of alternating steps including the steps of conveying the line to be consolidated and of adding products to the line to be consolidated. A consolidating field includes consolidating stations interconnected by conveying paths and an outlet path connecting a consolidating station to an outlet. A control unit includes a consolidation data storage device for receiving and storing consolidation data regarding the consolidating field and regarding an allocation of product types to consolidating stations. Products of at least one product type are supplied to each consolidating station. Lines to be consolidated are conveyed and product groups are added to lines to be consolidated simultaneously on different conveying paths and consolidating stations, and consolidated lines exit the consolidating field through the outlet all according to a specific clocked cycle. For each line to be consolidated, control sequences for the above steps are determined according to an optimization process using line data inputted into the control unit, the data regarding the consolidating field and the data regarding the allocation of product types to consolidating stations. The steps of conveying lines to be consolidated, adding product groups and conveying consolidated lines are based on control data generated according to the control sequences and to the specific clocked cycle.

22 Claims, 7 Drawing Sheets

$$K_1, K_2 \cdots K_n \cdots K_x, K_y$$

$$K_n = a_n A, \ b_n B, \ c_n C \cdots$$

21 ↓

[ 22 ]

↓

$$K_n' = (a_p A)_n, (a_p A)_n, (b_p B)_n, (b_p B)_n,$$
$$(a_{sn} A + b_{sn} B)_n, (c_n C)_n$$

↓

[ 23 ]

↓

|    | A        | B        | C   | D   | E   | 11                      |
|----|----------|----------|-----|-----|-----|-------------------------|
| T1 | $a_{sn}$ | $b_p$    | $c_n$ |     |     |                         |
| T2 | $a_p$    | $b_{sn}$ | 0   |     |     | $(c_n C)_n$             |
| T3 |          | $b_p$    | 0   |     | 0   | $(b_p B)_n$             |
| T4 |          |          | 0   | 0   |     | $(a_p A)_n$             |
| T5 | $a_p$    |          |     | 0   |     | $(a_{sn} A + b_{sn} B)_n$ |
| T6 |          |          |     |     | 0   | $(b_p B)_n$             |
| T7 |          |          |     |     |     | $(a_p A)_n$             |
| T8 |          |          |     |     |     |                         |

METHOD AND ARRANGEMENT FOR PRODUCING CONSOLIDATED LINES OF PRODUCTS

FIELD OF THE INVENTION

The invention relates to a consolidating method and arrangement in particular for consolidating printed products such as newspapers, magazines, brochures, etc.

BACKGROUND OF THE INVENTION

Consolidating means are known for producing lines of products of freely selectable size from a supply of different types of products, each consolidated line including a freely selectable number of product groups, each product group containing a freely selectable number of products of one product type. For producing a consolidated line, a number of consolidating steps are required, each step comprising adding to the line a product group or partial group, i.e. a predetermined number of products of one type. For this purpose, for each consolidating step, the growing line can be moved to the source of the corresponding product type or the product group can be moved to the growing line. Combinations of both methods are also possible.

According to the prior art, printed products are consolidated e.g. for customer-specific delivery, in that generally manually they are collected in stacks or corresponding containers to form consolidated lines having a predetermined composition and are then supplied to a packing station, where each line is packed e.g. into a number of packs having a maximum size and a number of packs smaller than the maximum size (advantageously only one such pack). Another use of consolidating is e.g. the compiling of lines of machine parts for joint further processing, e.g. assembly of the parts or the like.

Consolidating according to the state of the art is very costly due to the large amount of manual work involved and can be performed efficiently only with a high space and personnel expenditure.

SUMMARY OF THE INVENTION

The object of the present invention is to provide a consolidating method and an arrangement for performing the above method with which consolidating becomes highly efficient and fully automatable. However, the method is still intended to make it possible to produce consolidated lines in an optimum form, e.g. as a minimum number of easily further processed line parts (packs), in such a way that the further processing (packing) can be performed with a minimum expenditure and effort and is fully automatable.

This object is achieved by the consolidating method and the arrangement for performing the method, according to the invention.

The method according to the invention is based on an array or field of stationary consolidating stations, to each of which at least one product type is supplied and in which groups consisting of a predetermined number of products of said at least one product type are supplied to lines in the process of being consolidated. The consolidating stations are integrated into a network of connecting paths on which the lines in production are conveyed in a predetermined direction. In addition to the consolidating stations and the connecting paths connecting the stations, the consolidating field has at least one outlet, which is connected by means of outlet paths to at least part of the consolidating stations. On the outlet paths, finished lines or line parts are conveyed in the outlet direction.

Consolidating steps take place in this consolidating field in a time-parallel and time-cycled sequence. A cycle (time cycle), at least for the area of the consolidating field, comprises two parts, namely a conveying part and a consolidating part. During the conveying part, the lines being consolidated are conveyed along a path interval associated with a time cycle (position cycle), e.g. from one consolidating station to another. During the consolidating part, product groups are added to the lines. For shortening the cycle time it is advantageous to prepare the product groups during the conveying part of the time cycle (to separate the products and count them from a stock and combine them into groups) and to add the prepared group as a whole during the consolidating part to the line. The division into two parts of the time cycle only applies for the area of the consolidating stations. In the area of the outlet paths and the outlet of the consolidating field and in the area of the further processing of the consolidated lines, which can be subjected to the same cycle, the cycle is no longer divided into two, i.e. the entire time cycle can e.g. be utilized for conveying purposes.

The method according to the invention substantially includes linking, regarding time and locality, consolidating steps performed in a time-parallel and clocked or cycled manner at the consolidating stations, and conveying steps for conveying lines on the connecting and outlet paths, such that at the outlet or outlets of the consolidating field there is a continuous flow of consolidated lines and/or line parts with predetermined compositions in particular in a sequence according to specific conditions e.g. given by the nature of the further processing. In per se known manner this further processing e.g. consists of addressing and packing the consolidated lines and/or line parts and associating them with a particular dispatch route.

The overall path of a line being consolidated or of a line part in the consolidating field, i.e. the sequence of the connecting paths from one consolidating station to the next one and an outlet path to the outlet from the consolidating field is primarily determined by the predetermined composition of the line or line part, which defines the consolidating stations to which the line being consolidated is to be conveyed. The overall path can also be determined by a consolidating sequence (larger products first, etc.) made necessary by the format of the product types. The temporal cycle sequence (particularly the first cycle), in which a particular line or line part is consolidated, is determined in an optimization process, such that all the consolidating stations are used in a uniform optimum manner and "zero consolidating steps" are avoided (i.e. the supply of a product group with zero products). Constraints for the optimization process can result from requirements on the outlet sequence of the consolidated lines and/or line parts.

Each line or line part is organizationally identified by a designation and by a sequence of data records, comprising in each case a cycle number, a consolidating station and a number of products to be added. The sequence of the data records determines the path of the line or line part through the consolidating field and the sequence of time cycles in which this path is covered, i.e. the time cycle in which the line or line part appears at the outlet.

The position and time cycle control in the consolidating field can be absolutely rigid, i.e. in each cycle conveying and consolidating take place, or it can be more flexible in that the lines being consolidated can be buffered on connecting paths, in that the lines can pass through consolidating stations without a consolidating step, in that lines in production can remain for several cycles in one consolidating station, etc.

To the aforementioned physical method steps, which essentially comprise timed conveying of lines or line parts, preparation of product groups and the addition of product groups to lines or line parts, organizational method steps are added. These organizational method steps comprise substantially acquisition and editing of line data, path and cycle sequence allocation (optimization) and generation of control data.

Acquisition and editing of line data comprises the generation of line data determining a sum of line parts to be consolidated and the composition thereof (product and numbers of products), from line data acquired for each line (e.g. ordering data with product designations and product numbers) and from stored product data (e.g. product size) and line part data (e.g. pack size).

Path and cycle sequence allocation comprises allocation of paths through the consolidating field to the lines and/or line parts as defined by the edited line data, using data describing the consolidating field (allocation of product types to consolidating stations, connecting paths, outlet paths, conditions for the sequence of the consolidating steps). If several such paths are possible, the path is optimized in conjunction with the cycle sequence allocation. This cycle sequence allocation is advantageously performed in an optimization, which is constrained by sequence conditions at the outlet of the consolidating field and whose aim is to utilize in optimum manner all the consolidating stations.

Through the path and cycle sequence allocation for each consolidating station the consolidating step in each temporal cycle is associated with a specific line or line part. Furthermore, the outlet or discharge sequence of the lines and line parts is determined. From the data of said allocation step, control data for all the physical method steps in the consolidating field (conveying lines, preparing product groups, adding product groups to lines) are generated for each time cycle. It is also possible to generate further control data for the further processing of the consolidated lines and/or line parts (e.g. addressing, producing and allocating dispatch notes, invoices, etc.).

BRIEF DESCRIPTION OF THE DRAWINGS

The method and the arrangement for performing the method according to the invention are described in greater detail hereinafter in connection with the following Figures; wherein:

FIG. 2 shows a diagram concerning the function of the control unit of the consolidating field of FIG. 1.

DETAILED DESCRIPTION OF THE INVENTION

Figure 1:
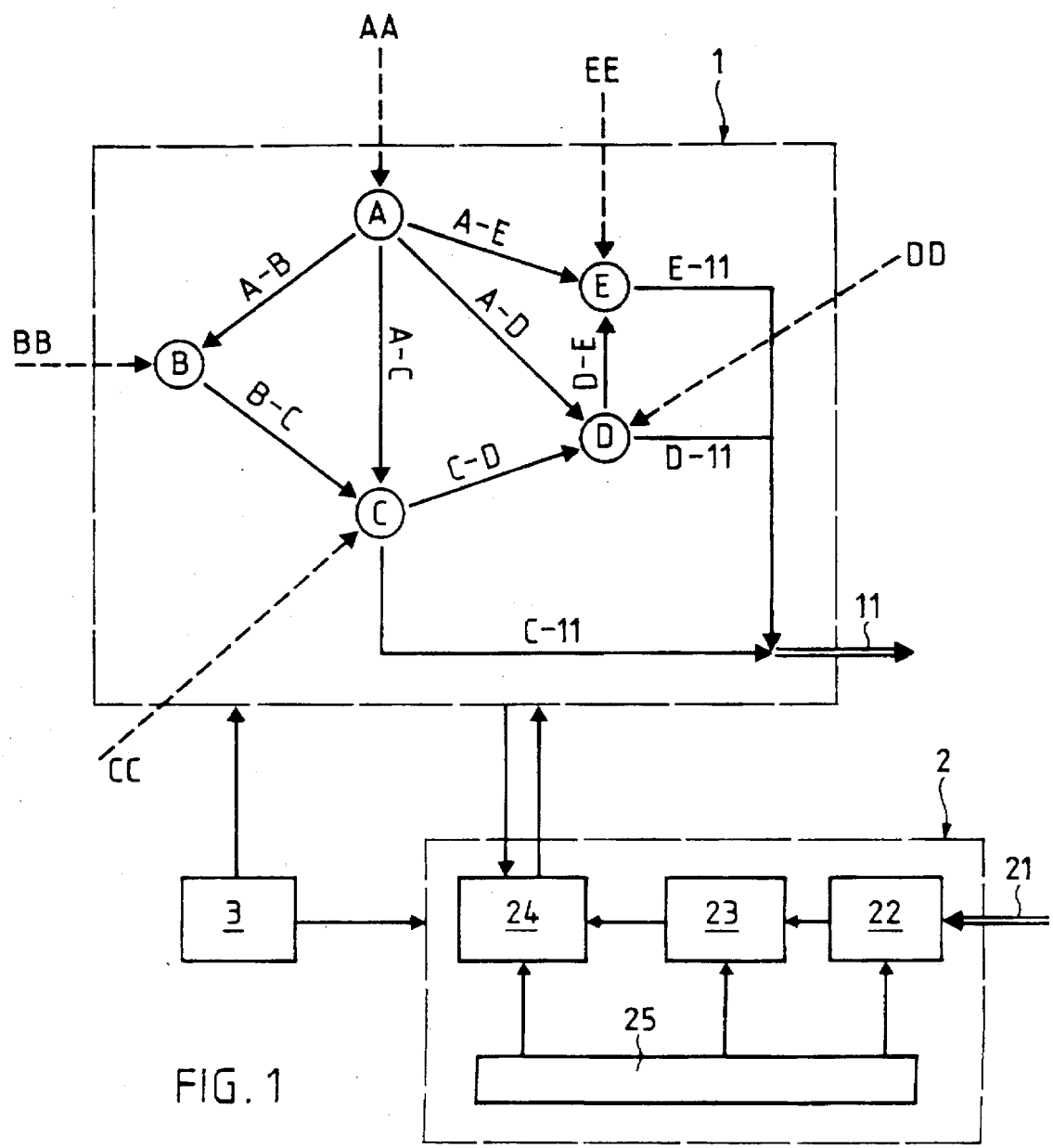
FIG. 1 shows a diagram of an exemplified consolidating field with a control unit for performing the method of the invention.

FIG. 1 very diagrammatically shows an exemplified consolidating field or array 1 for producing freely selectable lines from product types A, B, C, D and E with a control unit 2 and a clock unit 3. The consolidating field 1 has five consolidating stations which, for reasons of simplicity are designated with the letters A, B, C, D, E of the product types associated therewith. To said consolidating stations, products are supplied from sources AA, BB, CC, DD and EE. The consolidating field further has connecting paths A-B, B-C, A-C, etc. for conveying lines in production in the directions of the shown arrows. The consolidating field 1 also has outlet paths C-11, D-11 and E-11, through which at least part of the consolidating stations are connected to an outlet 11 and on which consolidated lines or line parts are conveyed to outlet 11.

The control unit 2 is shown diagrammatically subdivided into function boxes. These are: line data acquisition and editing device 22 with an input 21 for line data, path and cycle sequence allocation device 23, control data generation device 24 and a memory 25 for consolidating field data, product data, further processing data, etc., i.e. data which are dependent on the arrangement and the method in general and not on lines to be consolidated.

The control unit 2 is connected by data lines to the consolidating field or to individual elements thereof. Through these data lines, control data are sent into the consolidating field from the control unit and measurement data to the control unit from sensors. The consolidating field 1 and at least parts of the control unit 2 are subjected to a system cycle generated by a clock unit 3.

FIG. 1 is a functional and not a layout diagram of an exemplified, simple arrangement for consolidating. In a real arrangement according to the invention, the consolidating field 1, the control unit 2 and the clock unit 3 will not be totally separated from one another as represented in FIG. 1. It is possible for the control data generation, for example, to take place in the individual elements of the consolidating field, particularly in the consolidating stations and/or to integrate the clock unit into the control unit or to provide different synchronized clock units in the consolidating field.

In the consolidating field 1 shown in FIG. 1 a line with the exemplified composition 5A+3C+7E is consolidated on the following path sequence: A–A–C–C–C–D–D–D–E–E–E–11 or for short A-C-D-E-11, a zero consolidating step taking place at the consolidating station D.

FIG. 2 shows in greater detail the function of the control unit (2 in FIG. 1). At the line data input 21, a sequence of line data records $K_1, K_2 \ldots K_n \ldots K_x, K_y$ is inputted, each line data record consisting of a number of pairs of a product type designation and a product number. In general the data record for the nth line $K_n = a_n A, b_n B, c_n C \ldots$, i.e. said nth line consists of a product of the product type A, $b_n$ products of the product type B, $c_n$ products of the product type C, etc.

The editing of the line data (22) e.g. consists of breaking down the lines, if necessary, into line parts to be produced in the consolidating field, e.g. into $_p$ packs containing only products of a single product type and so-called peak packs containing products of different types. Thus, from the line data record of the nth line $K_n$, edited line data $K_n'$ in the form of a series of data records for line parts belonging to the nth line are created. For example, from $K_n:K_n'=(a_pA)_n, (a_pA)_n, (b_pB)_n, (b_pB)_n, (a_{sn}A+b_{sn}B)_n, (c_nC)_n$, in which $a_p$ or $b_p$ represent the number of products of the product type A or B in a standard pack containing only one product type, said number being a characteristic of the arrangement and the method and being independent of the lines to be consolidated. For the above, exemplified nth line: $2a_p+a_{sn}=a_n$.

From the line data editing, it can be gathered that the above, exemplified nth line is delivered in the form of two standard packs (maximum size) containing product type A, two standard packs containing product type B, a peak pack (maximum size or smaller) containing product types A and B and a peak pack (maximum size or smaller) containing product type C, whereby the index n associates all the packs with the nth line.

In a method in which the line sizes are freely selectable and lines are e.g. packed, as a whole, a line data editing of the aforementioned type can be omitted. A line data editing can also take into consideration maximum product numbers, which can be counted in one cycle or similar method or arrangement-specific limiting values.

In the path and cycle sequence allocation (23), paths are allocated to the line parts determined in the line data editing. For a consolidating field according to FIG. 1 and for the line parts of the above described exemplified line, these paths are: $(a_pA)_n$: A-C-11, A-D-11 or A-E-11; $(b_pB)_n$: B-C-11, A-B-C-D-11 or A-B-C-D-E-11; $(a_{sn}A+b_{sn}B)_n$: A-B-C-11 etc.

Cycle sequences are then allocated to the line parts in an optimization process and in the case of several path possibilities their allocation is also included in the optimization. Thus, per cycle and consolidating station, a data record is obtained, which contains the association of the line part to be added to and the number of products to be added, e.g.: T1/A: $(a_{sn}A+b_{sn}B)_n$, $a_{sn}$, i.e. in cycle 1 $a_{sn}$ products of type A are to be added to the first peak pack of the nth line.

FIG. 2 shows the result of the path and cycle sequence allocation (23) in a table a number of such data records representing a possible resulting sequence for consolidating the aforementioned nth line in a consolidating field according to FIG. 1. The association with the line parts are given in the right hand column (outlet). In order to illustrate the connection between the table representing a clocked time/position field, with the edited line data $K_n'$ of the nth line, the consolidation of the individual line parts is indicated by diagonal lines in the time/position clock field. The right hand column of the table shows the outlet sequence of the line parts at the outlet 11 of the consolidating field. The first peak pack $(a_{sn}A+b_{sn}B)_n$ of the described, exemplified nth line has, according to the table, the following consolidating data: T1/A:$a_{sn}$, T2/B: $b_{sn}$, T3/C: 0, T4/D: 0, T5/11.

From the clocked time/position field, control data for controlling the physical elements of the consolidating field are produced in a per se known manner in a method step for control data generation 24. The control data to be generated depend on the mechanical elements of the consolidating field. Control data are as shown in FIG. 2, e.g. clocked counting instructions for the preparation of product groups at the consolidating stations, but also control instructions for conveying steps or authorization to the consolidating stations, etc.

The consolidating method and the arrangement described in conjunction with FIGS. 1 and 2 represent a simple, exemplified case. The number of consolidating stations, the nature of the product supplies and their association with specific consolidating stations, as well as the set-up of the connecting and outlet paths in the consolidating field must be adapted for each specific case to the product types to be consolidated and to the expected contents of the lines to be consolidated. The function of the described arrangement is clocked regarding position and time in a rigid manner. As indicated hereinbefore, said rigidity can be loosened in different ways and more flexibility is obtained for optimization.

For example, between the consolidating stations and upstream of the outlet, buffers can be provided in such a way that the lines or line parts can wait for one or more cycles on the connecting paths without loss of their reciprocal order and therefore their identification, before being admitted to the next consolidating station. In such a case, the outlet can be subjected to a faster cycle corresponding to a further clocked processing. Several outlets can also be provided, e.g. outlets from each consolidating station.

For a very rapid cycle, it is possible to supply a product type from which a very large number of products is to be counted for a standard pack or whose counting or supply is slower, to a plurality of consolidating stations. For the same reason, a line can be kept for more than one cycle in one consolidating station. On the other hand, different product types which are more rarely used can be supplied to a single consolidating station.

Furthermore, it is possible for lines in production to pass through a station without any cycle loss, i.e. to be transported in one time cycle from one consolidating station to the next or to a further removed station, if the line has to pass the station for path reasons but no products need to be added thereto (zero consolidating step).

The lines or line parts can e.g. be consolidated as free stacks. These lines can be separated from one another and stabilized by conveying means, which form compartments (cf. FIGS. 6 to 8). However, the lines or line parts can also be consolidated in containers, which already form at least part of the pack. Such containers can also be supplied to a consolidating station of the consolidating field, a container then being added in a first consolidating step to each line or line part to be consolidated. In the consolidating field according to FIG. 1, the consolidating station A would be suitable for such a first consolidating step. The containers for the lines or line parts to be consolidated can e.g. be recycled within the consolidating arrangement or within a larger system, which e.g. includes the recipient of the line.

The product supplies to the consolidating stations are to be matched to the product types to be supplied. They can be fully automatic or at least partly manually operated. As indicated hereinbefore, the consolidating stations advantageously have a precollector, in which for each cycle a product group is prepared and is then added as a whole to the line or line part in production. This leads to an optimum utilization of the time because the line or line part in production is conveyed towards the product group and the product group is conveyed towards the line or line part.

The consolidating field with the associated control unit described in conjunction with FIGS. 1 and 2 can be varied and extended in numerous ways. A number of exemplified embodiments will be described in conjunction with FIGS. 3 to 5. The same elements are given the same reference numerals. The consolidating field 1 and the control unit 2 are represented by corresponding boxes with inlets and outlets.

Figure 3:
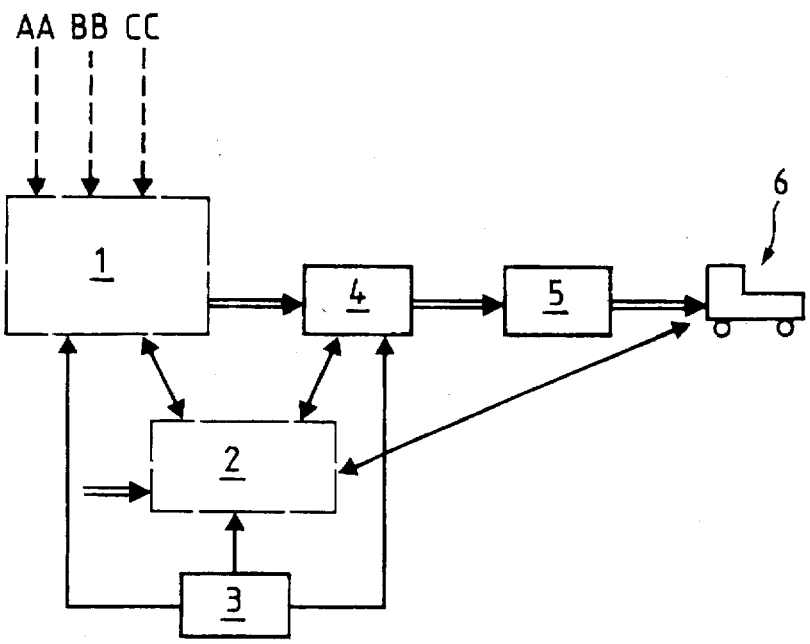
FIGS. 3 to 5 show diagrams of different embodiments of the arrangement for performing the method according to the invention.

FIG. 3 shows a consolidating arrangement extended by devices for further processing stations, which e.g. include an identification station 4 subjected to the system cycle of clock unit 3, in which identification station, each line or line part leaving the consolidating field is visibly identified as belonging to a particular destination, by applying an address sheet to it. The identification station is e.g. followed by a packing station 5, in which the lines or line parts are packed, e.g. filled into individual sacks or bags, bound or enveloped with sheets. Depending on the packing type, identification can also take place on the pack. From the packing station 5, the finished packs are supplied to a delivery station 6, where they are e.g. loaded into trucks.

If, as shown in FIG. 3, only a single delivery station 6 is provided, it is advantageous to organize the sequence of the line parts appearing at the outlet of the consolidating field and therefore at the delivery station 6 in such a way that the line parts belonging to one line appear after each other. This means that as a constraint for the path and cycle sequence optimization, the outlet sequence is only freely selectable within a line. Corresponding control data from the control unit may serve for line identification at the delivery station and for marking the start of a line (first line part) and the end thereof (last line part).

For preventing the delivery station from restricting the outlet sequence and therefore also the path and cycle sequence optimization, the delivery station can be equipped with a switch point system controlled by the control unit. Thus, line parts belonging to one line, even if they do not appear immediately after each other at the outlet, are allocated to a specific delivery path. The consolidating field can also have more than one outlet.

Figure 4:
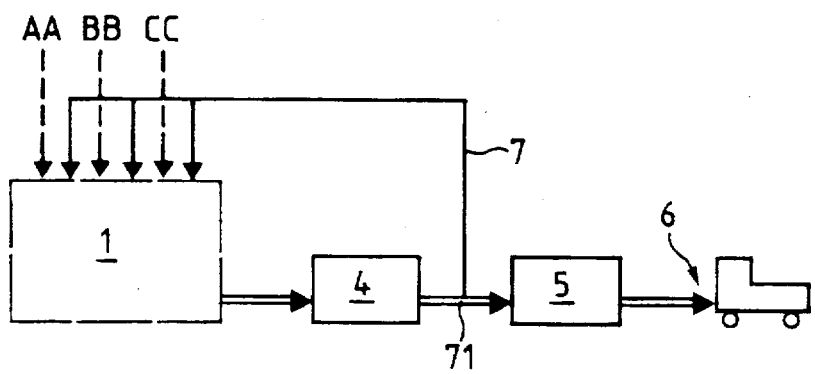

FIG. 4 shows another exemplified embodiment of the inventive arrangement with integrated return path container 7, the containers circulating within the arrangement and e.g., as shown, being resupplied to all the consigning stations. Containers and consolidated lines or line parts are separated from one another at a separating station 71. A separating station of this type, in which a conveying means engages in the containers and conveys the lines or line parts, thereby removing the containers from underneath the line, is e.g. described in European Patent 350,473 (Media Craft). The arrangement-internal containers can also, as mentioned, be supplied to only a single consolidating station, which then advantageously is not supplied with products to be added to lines.

Figure 5:
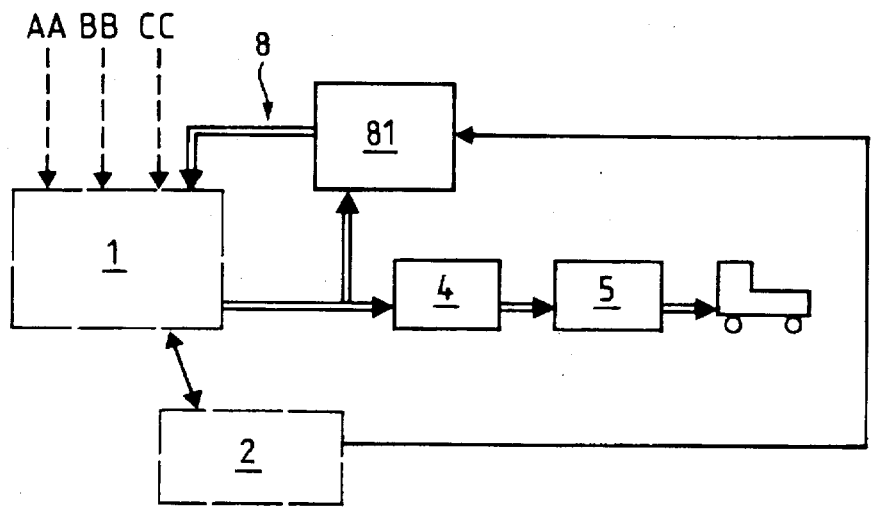

FIG. 5 shows the extension of the arrangement according to the invention by a line return path 8 for lines or line part and with a buffer 81 incorporated into said line return. Such a line return 8 of certain lines or line parts is e.g. necessary if more product types are to be consolidated than there are consolidating stations. Between two passes through the consolidating field, the product types supplied to at least part of the consolidating stations are then changed. The line return 8 can also be advantageous for avoiding zero consolidating steps. It can also be advantageous in the case of widely differing line compositions which, if to be mastered with one only passage through the consolidating field in each case, would necessitate a longer cycle time. The buffer 81 is also controlled by the control unit and is advantageously designed in such a way that each line or line part, independently of the time of its entrance into the buffer, can be removed therefrom again at any time, i.e. passed again into the consolidating field. A buffer equipped in this way leaves the sequence open for path and cycle sequence optimization, i.e. causes no or few restraining conditions.

Obviously the most varied arrangements are conceivable, in which features of the arrangements according to FIGS. 3 to 5 are combined, or several identical or different arrangements are combined.

Figure 6:
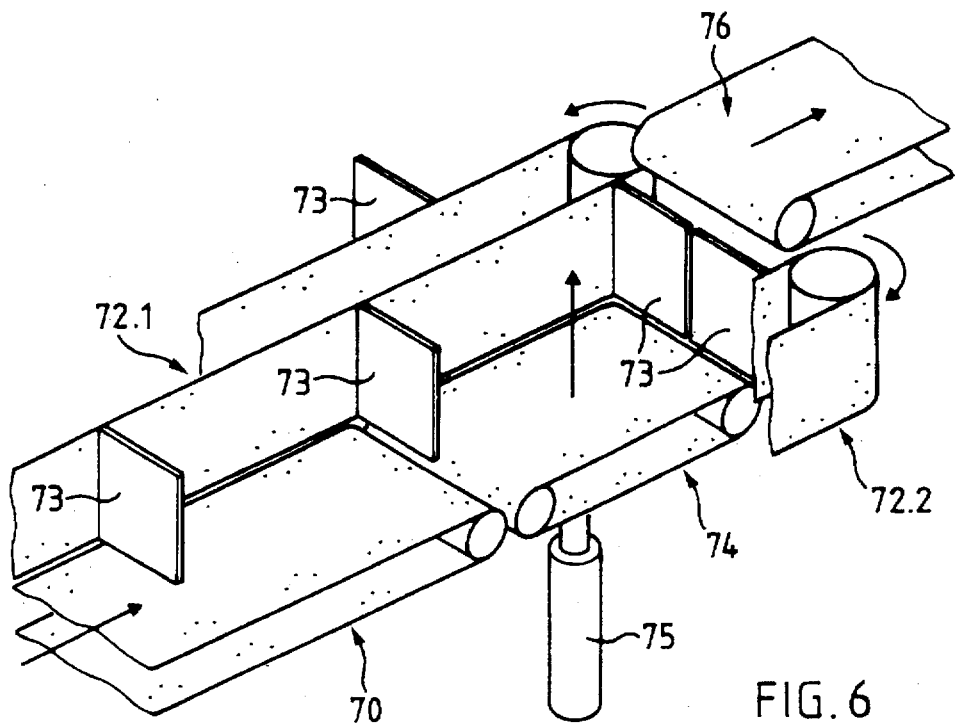
FIGS. 6 to 8 show an exemplified embodiment of a conveying means cooperating with a consolidating station.
Figure 7:
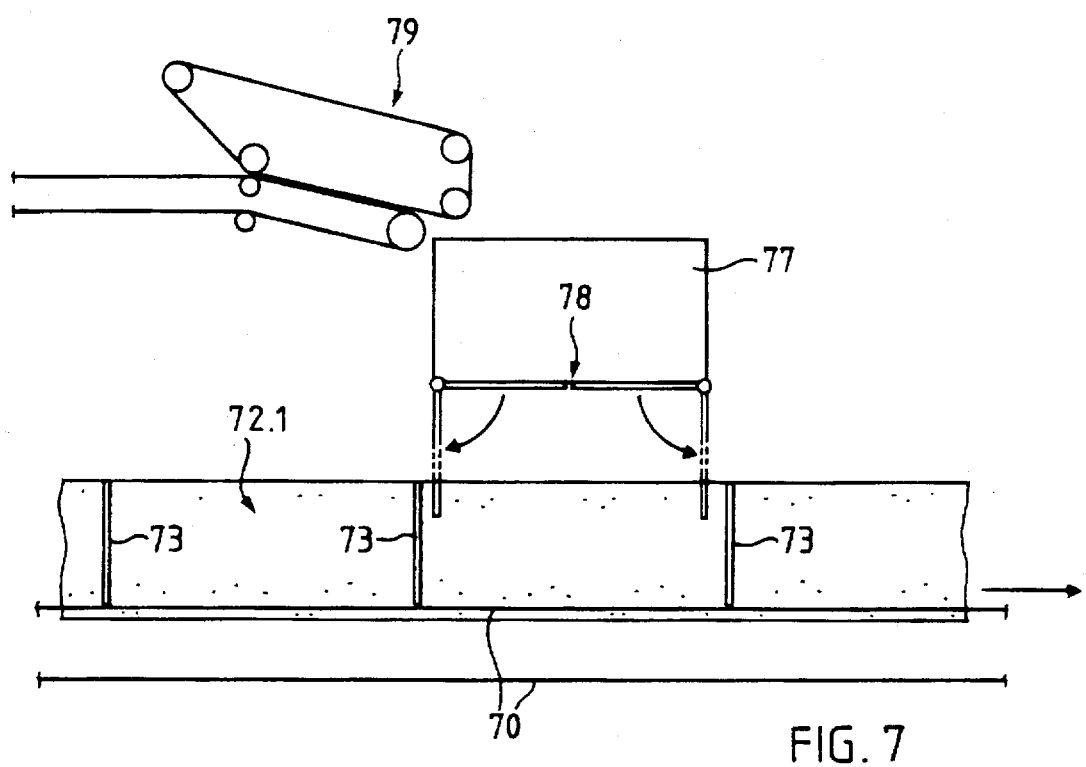
Figure 8:
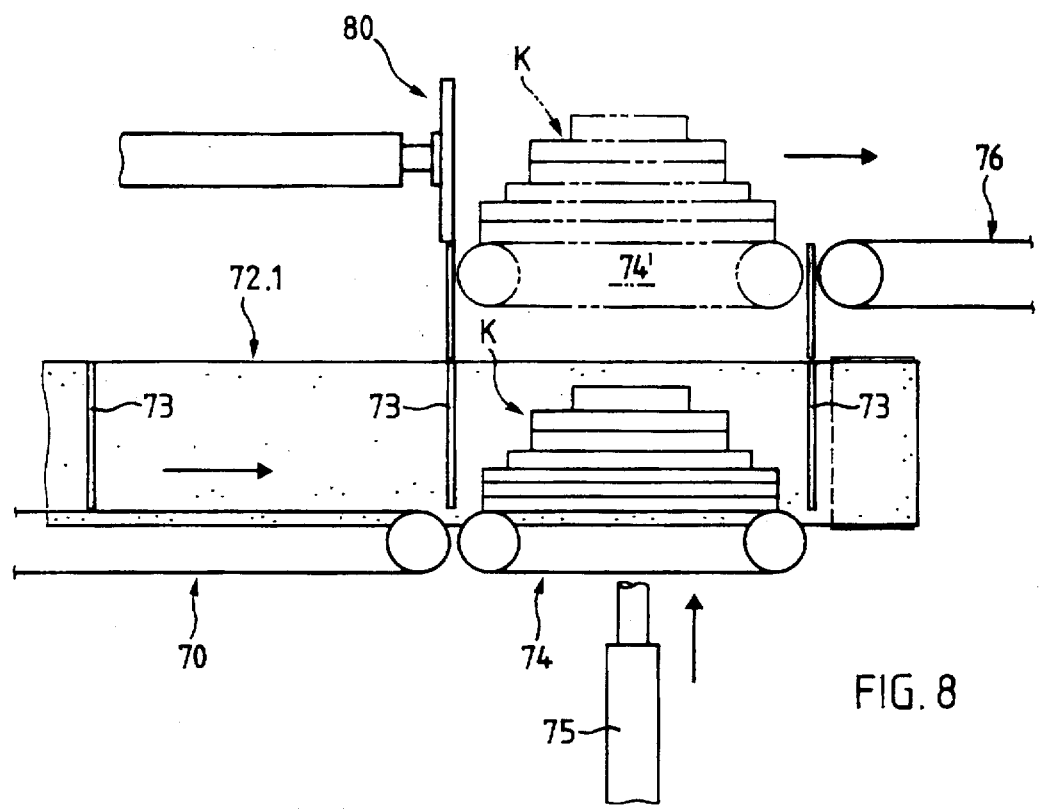

FIGS. 6 to 8 show an exemplified embodiment for the conveying means for conveying the lines or line parts being consolidated in the consolidating field and a consolidating station, which cooperates with the conveying means. Said conveying means is suitable for rigidly clocked consolidating fields or parts of consolidating fields.

FIG. 6 shows the conveying means, which essentially comprises a conveyor belt 70 and two side belts 72.1 and 72.2 positioned laterally with respect thereto and driven in synchronized manner with the conveyor belt 70. The side belts have dividing portions 73, which are positioned above the conveyor belt transversely to the side belts. As shown, these dividing portions can be arranged in pairs on both side belts and together have a width roughly corresponding to the conveyor belt width, or may be located only on one side belt and have a corresponding width. By means of the dividing portions 73 the conveying space above the conveyor belt is subdivided into compartments, in which lines or line parts are consolidated.

In order to remove lines or line parts from such compartments, e.g. for packing purposes, an end belt 74 can be arranged at the end of the conveying path of conveyor belt 70, the end belt having a length smaller than the length of a compartment and being flanked on either side by the side belts. The end belt 74 can be raised upwards e.g. with the aid of a hydraulic drive 75 in such a way that it is raised above the height of the dividing portion 73 with the line or line part placed thereon. At this level, a further conveying means, e.g. a further conveyor belt 76, receives the line or line part from the raised end belt 74. The conveyor belt 70, side belts 72.1 and 72.2 and the end belt 74 are driven in a cyclical manner. The dividing portions 73 can be equidistantly spaced. A position cycle then corresponds to the compartment length in the conveying direction or a multiple thereof. The conveyor belt 70 can e.g. be replaced by a roller train.

FIG. 7 shows a simple embodiment of a consolidating station, which cooperates with the conveying means of FIG. 6. It is a controlled singling or individualizing means 79 to which products of one type are supplied e.g. in the form of a scale flow. The individualizing means 79 counts a predetermined number of products into a precollector 77, which is positioned above a conveying means (70/72.1/72.2/73) according to FIG. 6. The precollector 77 has a bottom 78, which can be opened e.g. by flapping downwards. During the movement of the conveying means, the bottom 78 is closed and products are counted into the precollector. When the conveying means is stopped and a compartment is positioned below the precollector 77, the bottom 78 opens and the counted products drop into the compartment.

FIG. 8 again shows in detail the transition from a conveying means (70/72.1/72.2/73) with compartments to an identical or other, further conveying means 76 by raising a line or line part K above the side belts 72.1 and the dividing portion 73. In order to keep the line or line part K stable, it can be slid by means of a movable slider 80 surrounding it on three sides and possibly also at the top, from the raised end belt 74' onto the further conveying means 76. For a construction with a slider, the conveying direction of the further conveying means 76 can be different from the conveying direction of the conveyor belt 70, e.g. at right angles thereto. If the further conveying means 76 also has compartments, the shown device can also function for changing the direction on connecting paths between consolidating stations, or correspondingly extended, can operate as a switch point.

Figure 9:
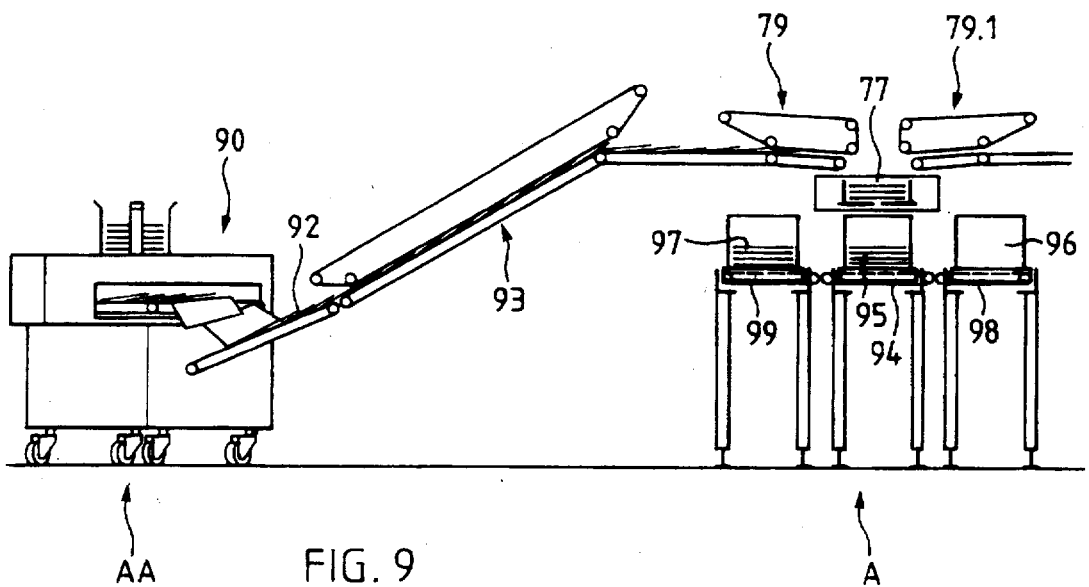
FIG. 9 shows an exemplified embodiment of a consolidating station with a product supply.

FIG. 9 shows in detail an exemplified embodiment of a consolidating station A with product supply AA, consolidating station A being connected with in each case one connecting path to a preceding and a following consolidating station, being connected to an outlet path and further having, in addition a container supply. The product supply AA is a sheet feeder 90, which is manually supplied with product stacks and produces a scale flow 92 consisting of individual products of the type A. This scale flow 92 is fed with the aid of a rising belt 93 to the consolidating station A. As described in conjunction with FIG. 7, at said station, the products are taken over by an individualizing or separating means 79 and are ejected in counted form into a precollector 77. The precollector 77 is positioned above the path 94 (perpendicular to the paper plane) of a line 95 and its bottom opens for a consolidating step, if a line in production is positioned below it. At right angles to the path 94 of the line is a not shown supply for containers 96 and a not shown outlet path for consolidated lines 97, which are connected to collecting paths (98,99) for containers 96 and consolidated lines 97, respectively. The consolidating station A also has a second individualizing means 79.1 to which a further supply of a second product type can be connected.

Connecting paths between consolidating stations, as well as outlet paths and supply paths for containers have advantageously the form of conveyor belts, which are either stopped and driven in a cyclic sequence or are operated continuously and cooperate with correspondingly controlled, closable cutoffs in the area of the outlet and/or inlet to the consolidating position below the precollector 77.

Feeders connectable as product supplies to consolidating stations are e.g. described in Swiss Patent 598,106. Product supplies can also be designed e.g. as unwinding stations or single copy applicators, as described e.g. in Swiss Patent 667,065 and Swiss Patent 666,237 or as purely manual supplies.

Figure 10:
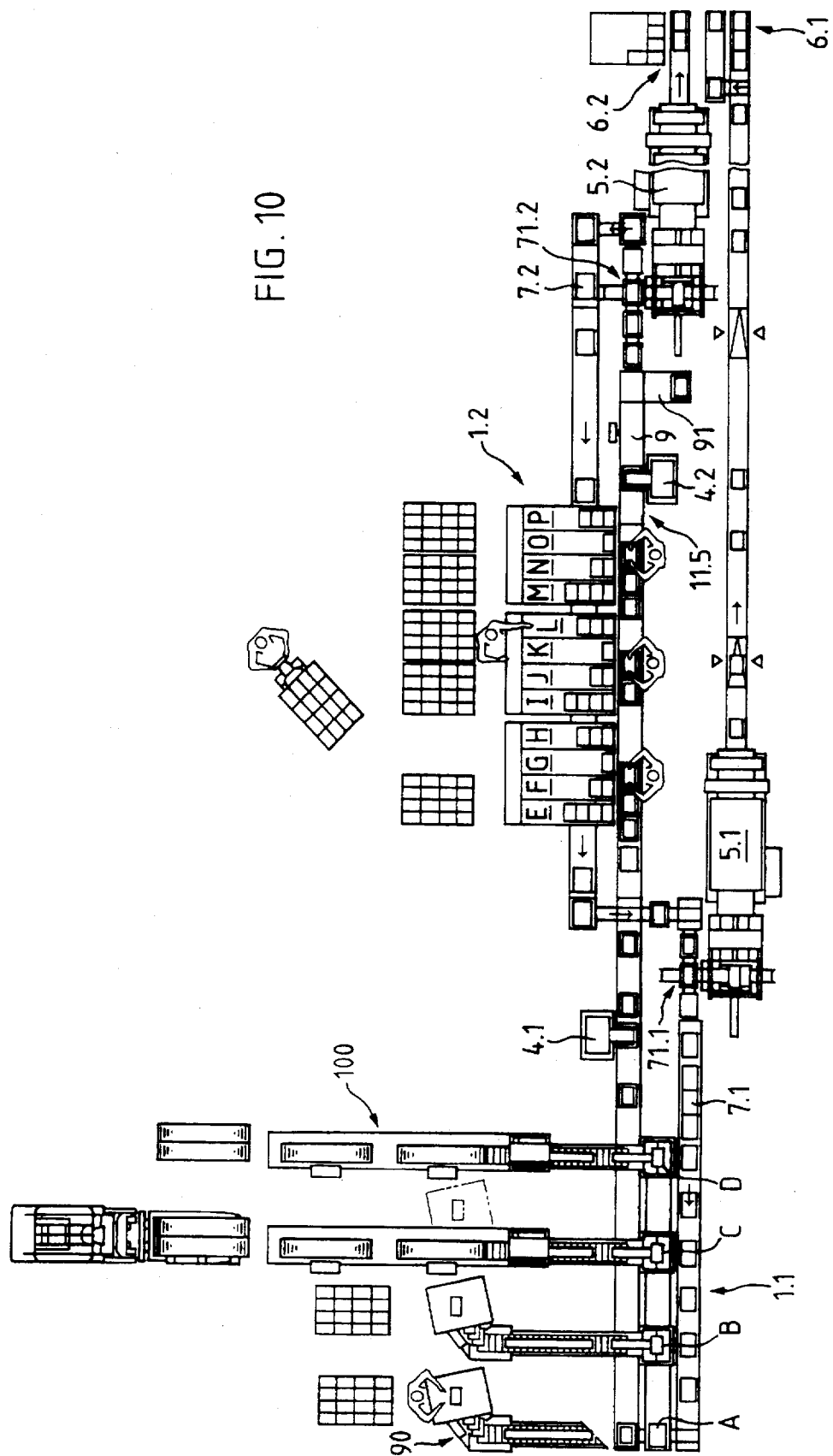
FIG. 10 shows an exemplified embodiment of the arrangement according to the invention for consolidating lines of newspapers, magazines, etc.
Figure 11:
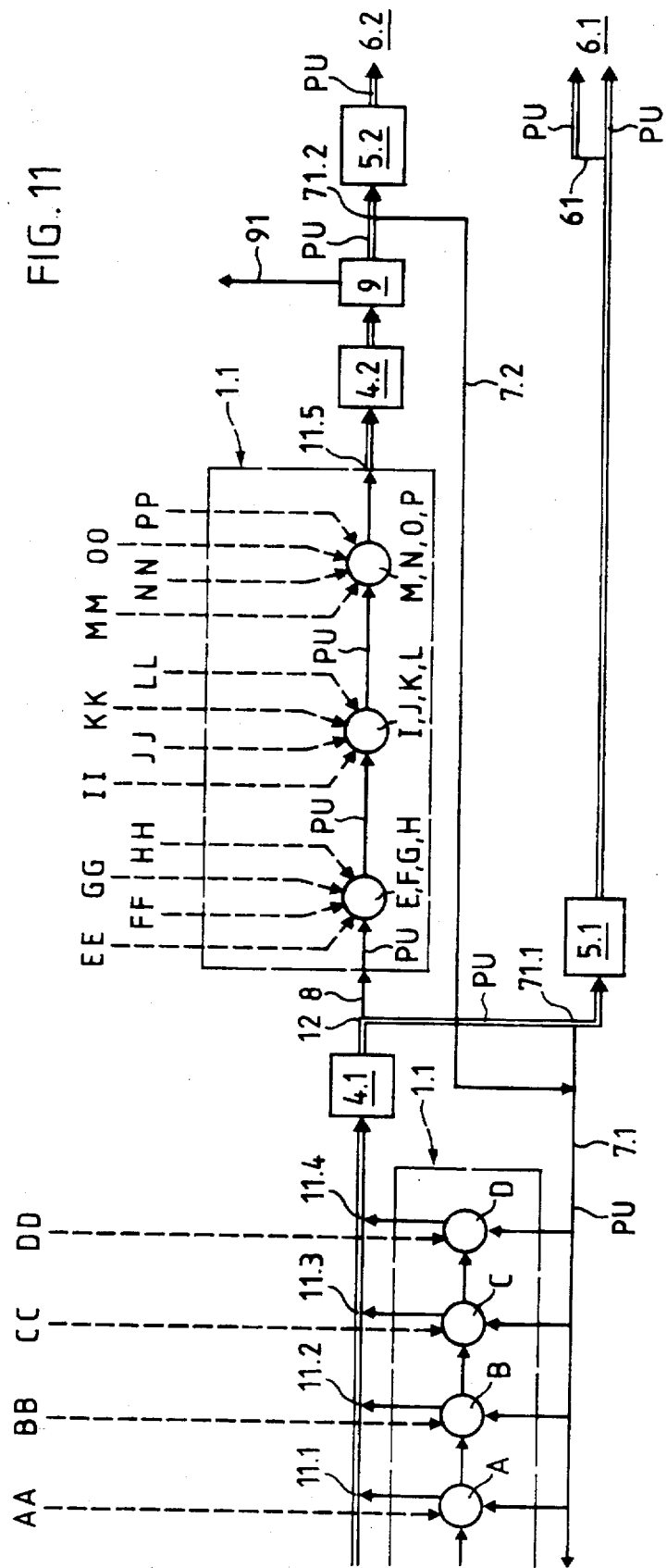
FIG. 11 is a diagrammatic representation of the arrangement of FIG. 10.

FIGS. 10 and 11 show an exemplified embodiment of a consolidating arrangement used for performing the method according to the invention, particularly in the field of consolidating printed products, i.e. for consolidating newspapers, magazines, brochures, etc. FIG. 10 shows the structure of the arrangement in detail, while FIG. 11 is a diagrammatical representation of the arrangement of FIG. 10 and depicts the method already illustrated in FIGS. 1 and 3 to 5. FIG. 11 shows the elements of the arrangement with the same reference numerals as in the aforementioned Figures. FIG. 10 contains only the most important reference numerals.

The arrangement comprises two spatially separated consolidating field parts 1.1 and 1.2 and operates with arrangement-internal consolidating containers, i.e. containers recycled within the arrangement. According to the invention, the consolidating field part 1.1 operates subjected to a system cycle, whereas the second, manually operated consolidating field part 1.2 operates in a per se known manner according to a rigid line sequence and with an individual cycle sequence.

The consolidating field part 1.1 has consolidating stations A, B, C, D arranged in a line. This line may continue to the left of the drawing as is intimated. To each consigning station, one product type from the feeder 90 (AA and BB) or from the unwinding station 100 (CC and DD) is supplied by means of product supplies AA, BB, CC, DD. The consolidating stations are interconnected by connecting paths (A-B, B-C,C-D) positioned on the line and they are connected to in each case one outlet path leading to an outlet 11.1, 11.2, 11.3, 11.4 (FIG. 11). The lines or line parts leaving the consolidating field part 1.1 are supplied to an identification station 4.1, which visibly identifies (addresses) the consolidated lines or line parts. They are then supplied to a packing station 5.1 and are conveyed from there to a delivery station 6.1 with a switch point system 61 and onto a specific delivery path corresponding to their association with a specific line. The containers in which the lines and line parts are consolidated, are separated from the lines upstream of the packing station 5.1, at a separating station 71.1 and are returned in a container return path 7.1 to each consolidating station of the consolidating field part 1.1.

Lines and/or line parts which are not complete on passing out of the consolidating field part 1.1, pass through the identification station 4.1 without being identified and by means of switch point 12, are conveyed along a return path 8 into the consolidating field part 1.2. The latter has three consolidating stations (E/F/G/H, I/J/K/L and M/N/O/P), to each of which four different products (EE, FF, GG etc.) are manually supplied and optionally are also manually added to the lines. The consolidating operators receive from the not shown control unit the number of copies to be added to the present line or line part by means of a corresponding indicator or display. The consolidating stations of the consolidating field part 1.2 are also arranged in a line and are interconnected with connecting paths along said line. As the consolidating field part 1.2 only has one outlet 11.5 and the latter is connected only with the last of the consolidating stations (M/N/O/P), lines or line parts, supplied into the consolidating field part 1.2, must pass through all the consolidating stations, even if e.g. only one product is to be added.

From the outlet 11.5 of the consolidating field part 1.2, the consolidated lines and/or line parts are supplied to a further identification station 4.2 and to a control station 9, where the lines and/or line parts are e.g. weighed. If their weight corresponds to the predetermined composition, they are passed onto a packing station 5.2 and a delivery station 6.2. Faulty lines or line parts are discharged (91). Upstream of the packing station 5.2 lines and/or line parts are separated from arrangement-internal containers (separating station 71.2) and by means of a container return 7.2 are returned to the consolidating field part 1.1.

The conveying path system of the arrangement according to FIGS. 10 and 11 has in different areas (designated PU in FIG. 11) buffer stations, where the lines, line parts or empty containers are buffered. They leave the buffer station in the same order in which they enter it (first-in/first-out principle), so that as a result, their sequence and identification are maintained.

A not shown control unit controlling the arrangement according to FIGS. 10 and 11 supplies control data for at least the following elements of the arrangement: consolidating stations (A, B, etc.) and conveying means on conveying paths (or entrance and exit for lines from consolidating stations), identification stations 4.1 and 4.2, switch points 12 between the consolidating field parts 1.1 and 1.2, control station 9 with switch point 91 for discharge, switch point system 61 of the delivery station 6.1. In the automatic consolidating stations A, B, C, D, the counters and precollectors as well as the movement of the lines and line parts in production and the supply of containers are controlled. The product supplies can be independently controlled with the help of sensors. In the manual consolidating stations (E/F/G/H, etc.) the display is controlled and for each consolidating step an acknowledgement action of the operator is recorded.

The arrangement according to FIGS. 10 and 11 is an exemplified embodiment of the arrangement according to the invention. As described in conjunction with FIGS. 3 to 5, it can be modified or extended in numerous different ways and therefore, can be adapted in an optimum manner to each product and line-specific consolidating method.

I claim:

1. A method for producing consolidated lines having a predetermined content of products of a plurality of product types, each line being produced in a sequence of alternating steps including the steps of conveying the line to be consolidated and of adding products to the line to be consolidated, the method comprising the steps of:

providing a consolidating field including:
  a plurality of consolidating stations;
  a plurality of conveying paths each of which connects two consolidating stations with one another;
  an outlet connected to at least one of the consolidating stations; and
  at least one outlet path connecting the at least one of the consolidating stations to the outlet;
providing a control unit including:
  a consolidation data input means for inputting consolidation data regarding the consolidating field and data regarding an allocation of product types to consolidating stations; and
  a consolidation data storage means coupled to the consolidation data input means for receiving consolidation data therefrom and for storing the consolidation data;
inputting line data regarding lines to be consolidated into the control unit;
supplying to each consolidating station products of at least one product type;
conveying lines to be consolidated along the conveying paths from one consolidating station to another;
adding product groups comprising a predetermined number of products of one product type to lines to be consolidated at each consolidating station;
conveying consolidated lines along the at least one outlet path and out of the consolidating field through the outlet;
simultaneously performing the steps of adding product groups and conveying consolidated lines on a plurality of conveying paths and in a plurality of consolidating stations;
subjecting the steps of conveying lines to be consolidated, adding product groups and conveying consolidated lines to a specific clocked cycle;
determining, for each line to be consolidated, control sequences for the steps of conveying lines to be consolidated, adding product groups, conveying consolidated lines and subjecting the steps of conveying, the step of determining being performed according to an optimization process using line data inputted into the control unit and the consolidation data; and
controlling the steps of conveying lines to be consolidated, adding product groups and conveying consolidated lines based on control data generated according to said control sequences and to the specific clocked cycle.

2. The method according to claim 1, further including the steps of:
  dividing at least part of the lines to be consolidated into line parts; and
  consolidating the line parts in the consolidating field.

3. The method according to claim 2, wherein the step of dividing comprises the steps of providing line parts at least part of which include a standardized number of products of only one product type.

4. The method according to claim 1, wherein the step of subjecting includes the step of subjecting the steps of conveying lines to be consolidated, adding product groups and conveying consolidated lines to a clocked cycle which comprises a conveying part in which lines are conveyed on conveying paths and a consolidating part in which products are added to lines.

5. The method according to claim 4, wherein the step of conveying lines to be consolidated is performed during each conveying part of the clocked cycle.

6. The method according to claim 4, further comprising the step of buffering the lines between consolidation stations.

7. The method according to claim 4, further comprising the step of preparing the product groups in consolidation stations during the conveying part of the clocked cycle, the step of preparing including the steps of:
  counting the predetermined number of products from a stock of products; and
  precollecting the predetermined number of products after the step of counting.

8. The method according to claim 1, wherein the steps of conveying lines to be consolidated and conveying consolidated lines include the step of conveying the lines to be consolidated and the consolidated lines in one of compartments of conveying means and containers.

9. The method according to claim 8, wherein the steps of conveying lines to be consolidated and conveying consolidated lines include the step of conveying the lines to be consolidated and the consolidated lines in containers, the method further including the steps of:
  separating the containers from one of the lines to be consolidated and the consolidated lines downstream from the outlet; and
  returning the container into the consolidating field.

10. The method according to claim 1, further comprising the step of further processing at least one of the consolidated lines and the lines to be consolidated downstream of the outlet, the step of further processing including at least one of the steps of visibly identifying, packing, controlling and allocating to specific delivery paths the at least one of the consolidated lines and the lines to be consolidated.

11. The method according to claim 1, further comprising the step of returning, from a point downstream of the outlet, at least one of the consolidated lines and the lines to be consolidated to the consolidating field.

12. An arrangement for producing consolidated lines having a predetermined content of products of a plurality of product types, each line being produced in a sequence of alternating steps including the steps of conveying the line to be consolidated and of adding products to the line to be consolidated, the arrangement comprising:
  a consolidating field including:
    a plurality of consolidating stations for adding products to lines to be consolidated;
    a plurality of conveying means connected to the consolidating stations for conveying the lines to be consolidated from one consolidating station to another consolidating station;
    an outlet connected to at least one of the consolidating stations; and
    an outlet conveying means connecting at least one of the consolidating stations to the outlet for conveying consolidated lines from the at least one of the consolidating stations out of the consolidating field;
  a control unit operatively coupled to the consolidating field and including:
    a consolidation data input means for inputting consolidation data regarding the consolidating field and data regarding an allocation of product types to consolidating stations; and
    a consolidation data storage means coupled to the consolidation data input means for receiving consolidation data therefrom and for storing the consolidation data;
  supply means connected to the consolidating field for supplying to each consolidating station products of at least one product type;

a clock unit for generating a clocked cycle for conveying lines to be consolidated along the conveying paths from one consolidating station to another and for adding product group comprising a predetermined number of products of one product type to lines to be consolidated at each consolidating station; and data lines for coupling the control unit to the consolidating stations for sending control data from the control unit to the consolidating stations.

13. The arrangement according to claim 12, wherein the outlet conveying means include an outlet path connecting each consolidating station to the outlet.

14. The arrangement according to claim 12, further comprising supply means for supplying containers to at least part of the consolidating stations.

15. The arrangement according to claim 12, wherein the conveying means form compartments for the lines to be consolidated.

16. The arrangement according to claim 15, wherein the conveying means comprise:

a conveyor belt; and side belts disposed laterally with respect to the conveyor belt, at least one of the side belts including a dividing portion thereon.

17. The arrangement according to claim 12, wherein the supply means comprise at least one of sheet feeders, unwinding stations and single copy applicators.

18. The arrangement according to claim 12, wherein the consolidating stations comprise precollectors.

19. The arrangement according to claim 18, wherein each precollector is disposed above a line to be consolidated and includes a bottom portion which is one of openable and removable.

20. The arrangement according to claim 12, further comprising at least one of an identification station, a packing station, a delivery station and a return path for containers having a separating station for separating consolidated lines from containers.

21. The arrangement according to claim 12, further comprising a line return path for returning, from a point downstream of the outlet, at least one of the consolidated lines and the lines to be consolidated to the consolidating field.

22. The arrangement according to claim 12, wherein:

the clock unit is adapted to generate a number of differing clocked cycles; and the consolidating field comprises a plurality of consolidating field parts subjected to the differing clocked cycles.

* * * * *